United States Patent
Müller et al.

(10) Patent No.: US 10,864,788 B2
(45) Date of Patent: Dec. 15, 2020

(54) FOUR-POINT LINK

(71) Applicants: ZF Friedrichshafen AG, Friedrichshafen (DE); SCHÄFER MWN GMBH, Renningen (DE)

(72) Inventors: Ingolf Müller, Minfeld (DE); Jens Heimann, Stetten (DE); Manfred Bürgmann, Ravensburg (DE); Ignacio Lobo Casanova, Markdorf (DE); Andre Stieglitz, Osnabrück (DE); Carsten Sohl, Fredericia (DK); Valentin Hörtdörfer, Stuttgart (DE)

(73) Assignees: ZF Friedrichshafen AG, Friedrichshafen (DE); SCHÄFER MWN GMBH, Renningen (DE)

(*) Notice: Subject to any disclaimer, the term of this patent is extended or adjusted under 35 U.S.C. 154(b) by 17 days.

(21) Appl. No.: 16/302,732

(22) PCT Filed: May 11, 2017

(86) PCT No.: PCT/EP2017/061257
§ 371 (c)(1),
(2) Date: Nov. 19, 2018

(87) PCT Pub. No.: WO2017/202614
PCT Pub. Date: Nov. 30, 2017

(65) Prior Publication Data
US 2019/0143776 A1   May 16, 2019

(30) Foreign Application Priority Data
May 24, 2016   (DE) .................. 10 2016 209 041

(51) Int. Cl.
B60G 7/00   (2006.01)

(52) U.S. Cl.
CPC ........ B60G 7/001 (2013.01); *B60G 2206/017* (2013.01); *B60G 2206/12* (2013.01);
(Continued)

(58) Field of Classification Search
CPC ...... B60G 2206/7101; B60G 2206/121; B60G 7/001; B60G 2206/7104; B60G 2206/85; B60G 2206/12; B60G 2206/017
(Continued)

(56) References Cited

U.S. PATENT DOCUMENTS 4,552,035 A * 11/1985 Skipper .................. F16C 7/026
                                                                74/581
4,650,620 A *  3/1987 Owen ..................... B29C 44/12
                                                               264/137
(Continued)

FOREIGN PATENT DOCUMENTS

DE   10 2005 002 515 A1   7/2006
DE      102005002515 A1 * 7/2006 ............... B60G 9/02
(Continued)

OTHER PUBLICATIONS

Machine Translation of DE-102005002515-A1 (Year: 2005).*
(Continued)

*Primary Examiner* — James A English
*Assistant Examiner* — Kurtis Nielson
(74) *Attorney, Agent, or Firm* — Davis & Bujold PLLC; Michael J. Bujold

(57) ABSTRACT

A four-point link (1) for a wheel suspension of a vehicle, having a core element (2), a thread (3) and four bushings (6). The thread (3) is pre-impregnated with a resin. The core element (2) has a torsional element (4) and four supporting arms (5) integrally connected to the torsional element (4). A bushing (6) is arranged, on each respective distal end of the supporting arms (5), for holding a respective bearing ele-
(Continued)

ment. The core element (2) and the respective bushings (6) are at least partially wrapped with the thread (3) in order to connect the bushing (6), in each case, to the thread (3) at least in a non-positive manner. In addition, a method for producing the above-mentioned four-point link (1).

13 Claims, 3 Drawing Sheets

(52) U.S. Cl.
CPC .................. *B60G 2206/121* (2013.01); *B60G 2206/7101* (2013.01); *B60G 2206/7104* (2013.01); *B60G 2206/85* (2013.01)

(58) Field of Classification Search
USPC .................................................. 280/124.134
See application file for complete search history.

(56) References Cited

U.S. PATENT DOCUMENTS

| | | | |
|---|---|---|---|
| 5,690,034 A | 11/1997 | Schähl et al. | |
| 6,324,940 B1 * | 12/2001 | Pazdirek | B29C 53/585 |
| | | | 174/47 |
| 9,555,683 B2 | 1/2017 | Eismann et al. | |
| 10,493,703 B2 * | 12/2019 | Yasui | B29C 70/30 |
| 2015/0101889 A1 * | 4/2015 | Kere | B66B 7/085 |
| | | | 187/254 |
| 2017/0182720 A1 * | 6/2017 | Krautkramer | B65H 54/54 |
| 2017/0355239 A1 * | 12/2017 | Souschek | B29C 70/222 |

FOREIGN PATENT DOCUMENTS

| | | | | |
|---|---|---|---|---|
| DE | 10 2011 079 654 A1 | | 1/2013 | |
| EP | 0 283 974 A2 | | 9/1988 | |
| EP | 1 787 833 A1 | | 5/2007 | |
| EP | 2 684 714 A1 | | 1/2014 | |
| EP | 2 995 483 A2 | | 3/2016 | |
| GB | 2 154 520 A | | 9/1985 | |
| JP | 62191208 A | * | 8/1987 | .......... B60G 11/181 |
| JP | 2014133446 A | * | 7/2014 | ............. B60G 7/001 |
| WO | 99/09563 A1 | | 2/1999 | |
| WO | 2014/177762 A1 | | 11/2014 | |
| WO | WO-2015197279 A1 | * | 12/2015 | ............... B60G 9/00 |

OTHER PUBLICATIONS

Machine Translation of JP-2014133446-A (Year: 2014).*
International Search Report Corresponding to PCT/EP2017/061257 dated Aug. 14, 2017.
Written Opinion Corresponding to PCT/EP2017/061257 dated Aug. 14, 2017.

* cited by examiner

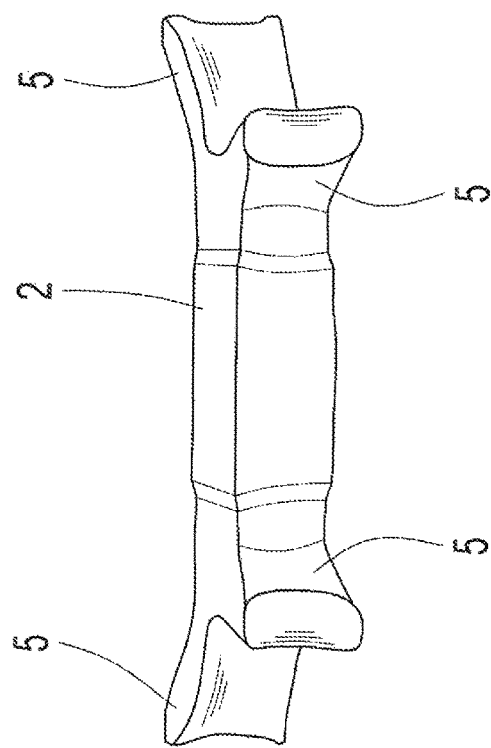
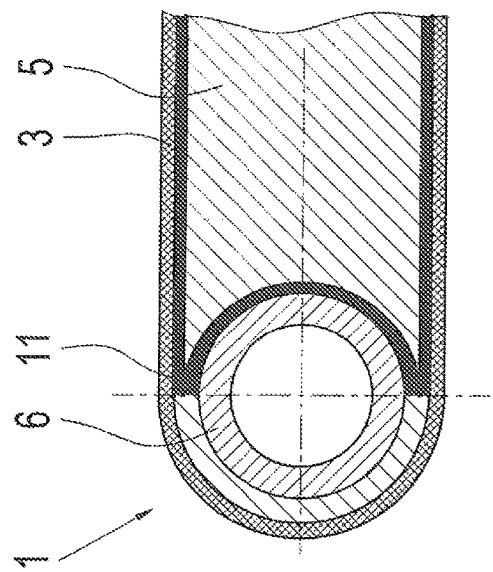
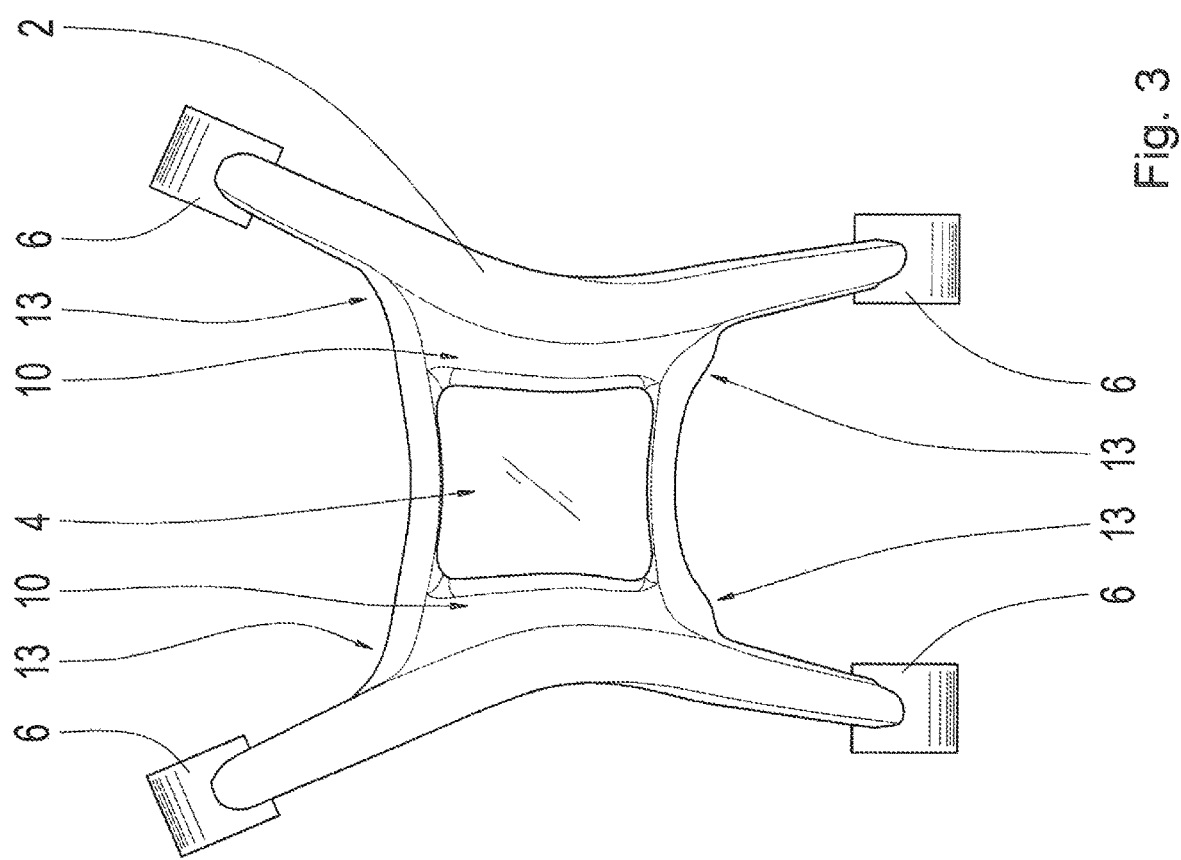

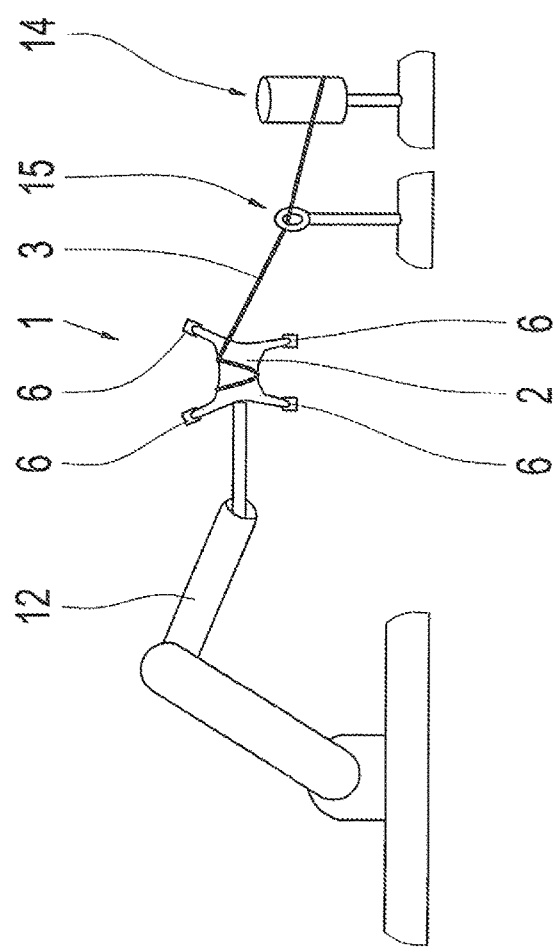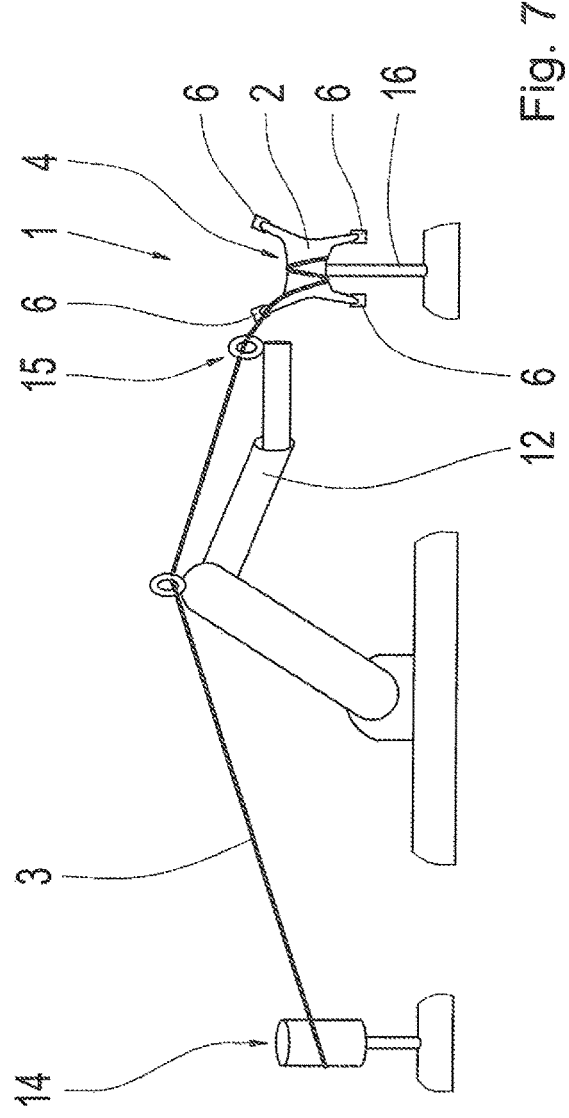

US 10,864,788 B2

FOUR-POINT LINK

This application is a National Stage completion of PCT/EP2017/061257 filed May 11, 2017, which claims priority from German patent application serial no. 10 2016 209 041.0 filed May 24, 2016.

FIELD OF THE INVENTION

The invention relates to a four-point link for a wheel suspension of a vehicle, in particular for a wheel suspension of a passenger car or a utility vehicle. In addition, the invention relates to a method for producing the four-point link.

BACKGROUND OF THE INVENTION

Four-point links are used particularly in utility vehicles in order to guide a rigid axle in a sprung manner in a vehicle chassis. In such cases the four-point link is responsible for the transverse guidance and the longitudinal guidance of the axle. In addition, the four-point link fulfils the function of a stabilizer.

From EP 1 787 833 A1 a four-point link with a torsional element and two supporting elements is known. The supporting elements extend in the longitudinal direction of the vehicle and each has two mounting bushings. In each case a mounting bushing of a supporting element is mounted on the chassis of the vehicle. The rigid axle is fixed into the respective other bushing. The torsional element arranged in the transverse direction of the vehicle connects the two supporting elements to one another. For that purpose the torsional element has two through-going cutouts, each of which encloses a supporting element. Thus, swiveling movement of the supporting elements relative to one another results in a torsion of the torsional element. The supporting elements and the torsional element consist of sheet metal or castings and are welded to one another.

Furthermore, DE 10 2011 079 654 A1 describes a four-point link made from a fiber-plastic composite material. This four-point link is of integral or monoblock design. That makes the four-point link very light, but is disadvantageous from the standpoint of mass production.

SUMMARY OF THE INVENTION

The purpose of the present invention is to develop further a four-point link made of a fiber-plastic composite material for a wheel suspension of a vehicle, such that in particular the suitability for mass production is improved and the production costs are reduced.

This objective is achieved by the object of the independent claims. Preferred embodiments are the object of the dependent claims.

The four-point link according to the invention for a wheel suspension of a vehicle comprises a core element, a thread and four bushings, such that the thread is pre-impregnated with a resin, and, further, the core element comprises a torsional element and four supporting arms integrally connected to the torsional element, wherein at the distal end of each supporting arm is arranged a respective bushing in order to receive a respective bearing element. The core element and the respective bushings are at least partially wrapped around with the thread in order to connect the bushings and the thread to one another by friction. The thread is understood to be a reinforcing fiber (filament), a bundle of fibers (multi-filament, roving) or a textile-processed multi-filament.

A wheel suspension is understood to mean a device that couples the wheels of the vehicle in a steerable and/or sprung manner to a vehicle body and/or a chassis frame of the vehicle. The vehicle can be a motor vehicle, in particular a utility vehicle, but also a passenger car.

The core element is provided essentially for forming the shape of the four-point link. Thus, the core element is not provided in order to carry loads but rather, exclusively to be covered or wrapped around with the thread. In other words, the loads and forces introduced by way of a vehicle axle or a wheel carrier are taken up only by the outer shell formed by the thread. Thus, the thread is connected at least by friction to the four bushings. In particular, the thread is also connected in a form-fitting manner with the four bushings.

The four supporting arms are provided in order to couple the vehicle axle or wheel carrier to the chassis and/or a body of the vehicle. For this, two supporting arms are articulated to the vehicle axle or the wheel support while the other two supporting arms are articulated to the vehicle body or the chassis of the vehicle. The supporting arms are connected to one another by way of the torsional element. In this context articulated denotes an ability to rotate about at least one axis. The torsional element serves to stabilize the four supporting arms against pivoting. The supporting arms and the torsional element are arranged in such manner that swiveling of a particular supporting arm, i.e. swiveling of the supporting arm concerned about the torsion axis, is accompanied by a torsion of the torsional element. This torsion is produced as the result of a torque exerted by the supporting arm concerned on the torsional element during the swiveling.

Due to its mode of fabrication, in particular due to the fiber orientation produced by the winding operation, the four-point link enables the production of a defined torsional rigidity in relation to roll stabilization, high lateral rigidity for guiding the axle, a definite longitudinal compliance in relation to particular comfort behavior and the creation of a defined kinematic or elastic-kinematic behavior over the spring deflection. In particular, as far as possible almost the entire kinematic is reproduced by the four-point link itself and this relieves the load on the bearing elements, in particular rubber bearings, held in the bushings.

The thread or thread group preferably consists of a plurality of endless fibers impregnated with a resin. A fiber group is understood to mean a plurality of fibers collected into a bundle. The bundle in turn constitutes the thread. In particular, the thread can be impregnated immediately before being wound onto the core element, or it can be a thread previously impregnated with resin. In particular a so-termed TowPreg semifabricate or PrePreg thread can be used. In the wet-winding process, the thread is soaked in resin immediately before winding and then wrapped around the core element. A maximum deposition rate of the thread onto the core element, of around 0.5 m/s, is imposed for example due to centrifugal forces during winding. In contrast, the deposition rate can be increased considerably when using pre-impregnated thread, since the resin has dried so that centrifugal forces have no effect. Thus, the thread is in the form of a fiber-plastic composite material. Preferably the thread is made from a carbon-fiber reinforced plastic, a glass-fiber reinforced plastic, an aramide-fiber reinforced plastic or some other suitable fiber-plastic composite material.

In a preferred further development of the components, the thread is tensioned, i.e. acted upon by a force that tensions the thread. As a result the thread is held on the supporting arm concerned and the torsional element by friction force. Preferably the thread runs in such manner that swiveling of the supporting arm concerned induces a force acting on the thread owing to the friction force between the thread and the supporting arm, which force is in turn transferred to the torsional element due to the friction force between the thread and the torsional element. During this the force so induced increases the tension of the thread.

The invention includes the technical principle that just one thread is wound many times around the core element and the respective bushings. In particular the thread is automatically unwound from a winding spindle and wound systematically onto the core element by a robot in order to form the four-point link. Furthermore, however, it is also conceivable that two or more robots at the same time wind respective threads onto the core element in order to form the four-point link. If more than one parallel thread are used instead of a single thread, the production time is reduced.

Preferably, the core element is made from a foam material. In particular the core element is made from a solid, light, permanent foam material. Preferably, the foam material consists of a polymer such as polyurethane or polystyrol. Moreover, the core element can also be an inliner core, a lost core or a blown core. What is in particular essential, is that the core element should be capable of being wrapped with the thread, and should thus serve as a shaper.

Preferably, each bushing is formed from a metallic material. In particular, the bushing is formed from a steel alloy or a light-metal alloy, especially an aluminum or magnesium alloy. Furthermore the bushing is at least adhesively bonded to the core element. The core holds the bushing during the wrapping process in such manner that its position is secured.

According to a preferred example embodiment, on each supporting arm the thread is guided essentially parallel to a respective longitudinal axis of the supporting arm concerned. Preferably the thread is wound radially around the supporting arm and the torsional element connected integrally thereto. In particular, the two supporting arms on the chassis side are angled relative to the torsional element in such manner that the thread can be laid onto the core element in a continuous winding process. The supporting arms are provided essentially in order to accommodate some bending.

Preferably, on an end face of the supporting arm concerned the thread is guided within an angular range of 15° to 45° relative to a longitudinal axis 7 of the supporting arm 5 concerned. This in particular enables the absorption of shear stresses generated by transverse forces. Preferably, on their respective end faces the supporting arms are wrapped by the thread in a framework pattern. In that way each supporting arm is made more rigid in a lightweight manner. Alternatively, the thread can be wrapped all over the surface.

Also preferably, on the torsional element the thread is guided within an angular range of 40° to 60° relative to a longitudinal axis of the four-point link. The torsional element is in particular loaded by shear stresses generated by torsion. In particular the entire surface of the torsional element is covered by the thread, especially wound around it several times. Preferably the entire surface of the core element is covered by the thread, in particular several times.

According to a preferred example embodiment, the core element has cutouts to accommodate a plurality of thread turns. In other words, notch-like cutouts are formed in the core element, which are provided in order to receive several layers of the thread without forming undesired clumps, in particular bulges of the material, on the outside surface of the four-point link. Furthermore the core element is so shaped that particularly at turning points on the core, flattened contact areas are provided so that the thread can be laid, advantageously stretched and under stress, onto the core element.

In a preferred example embodiment, each bushing is at least partially connected to an interlocking load-transfer element, such that the load-transfer element is connected at least in a frictional manner to the thread. The load-transfer element is essentially provided in order to absorb compressive forces whereas the thread is provided essentially to absorb tensile forces. In particular an adhesive layer is formed between the load-transfer element and the bushing and/or between the load-transfer element and the thread, which is provided in order to increase the adhesion between the load-transfer element and the bushing and/or between the load-transfer element and the thread. Moreover, however, it is also conceivable to increase the adhesion between the load-transfer element and the thread by a suitable surface treatment of the load-transfer element or an adhesion promoter. The load-transfer element is preferably made from a metallic material. In particular the load-transfer element is made from a steel alloy or a light-metal alloy, especially an aluminum or a magnesium alloy. Furthermore, the load-transfer element is produced as a casting, or by deformation or by machining. For example, the load-transfer element concerned is made from a sheet material. Alternatively, the load-transfer element is formed from a fiber-reinforced plastic (such as a sheet molding compound).

The method according to the invention for producing the four-point link according to the invention comprises in particular the following process steps. First the core element is made, such that the core element comprises a torsional element and four supporting arms connected integrally with the torsional element. Then, a respective bushing is connected to the distal end of each supporting arm. In particular, the respective bushing is adhesively bonded to the distal end of the supporting arm concerned. Finally, the core element and the respective bushings are at least partially wrapped with a pre-impregnated thread to produce an at least partial frictional connection between the bushings and the thread. In particular the thread is wrapped around the core element and the four bushings in such manner that in essence the entire surface of the four-point link is formed by the thread. The individual process steps are preferably carried out in the sequence indicated. However, different procedures are also possible if permitted by the technical circumstances.

According to a preferred example embodiment the core element is held on a robot arm, so that during the winding process the core element is guided along with the thread by the robot arm. Preferably the robot arm can move in three dimensions. In particular the thread is unwound from a winding spindle and wrapped around the core element. Preferably, the thread is in the form of a TowPreg. In an alternative example embodiment the core element is held on a spindle and the thread is guided by a robot arm in order to wrap the thread around the core element. In particular the spindle is mounted so that it can rotate. Alternatively, one or more changes of the fixed winding axis (reorientations) can be carried out during the course of the wrapping process.

BRIEF DESCRIPTION OF THE DRAWINGS

Below, preferred example embodiments of the invention are explained in greater detail with reference to the drawings, in which the same or similar elements are given the same indexes. The drawings show:

FIG. 6: A schematic diagram to illustrate a method for producing the four-point link of FIG. 1 according to the invention, and FIG. 7: A schematic diagram to illustrate another method for producing the four-point link of FIG. 1 according to the invention.

DETAILED DESCRIPTION OF THE PREFERRED EMBODIMENTS

Figures 1, 2:
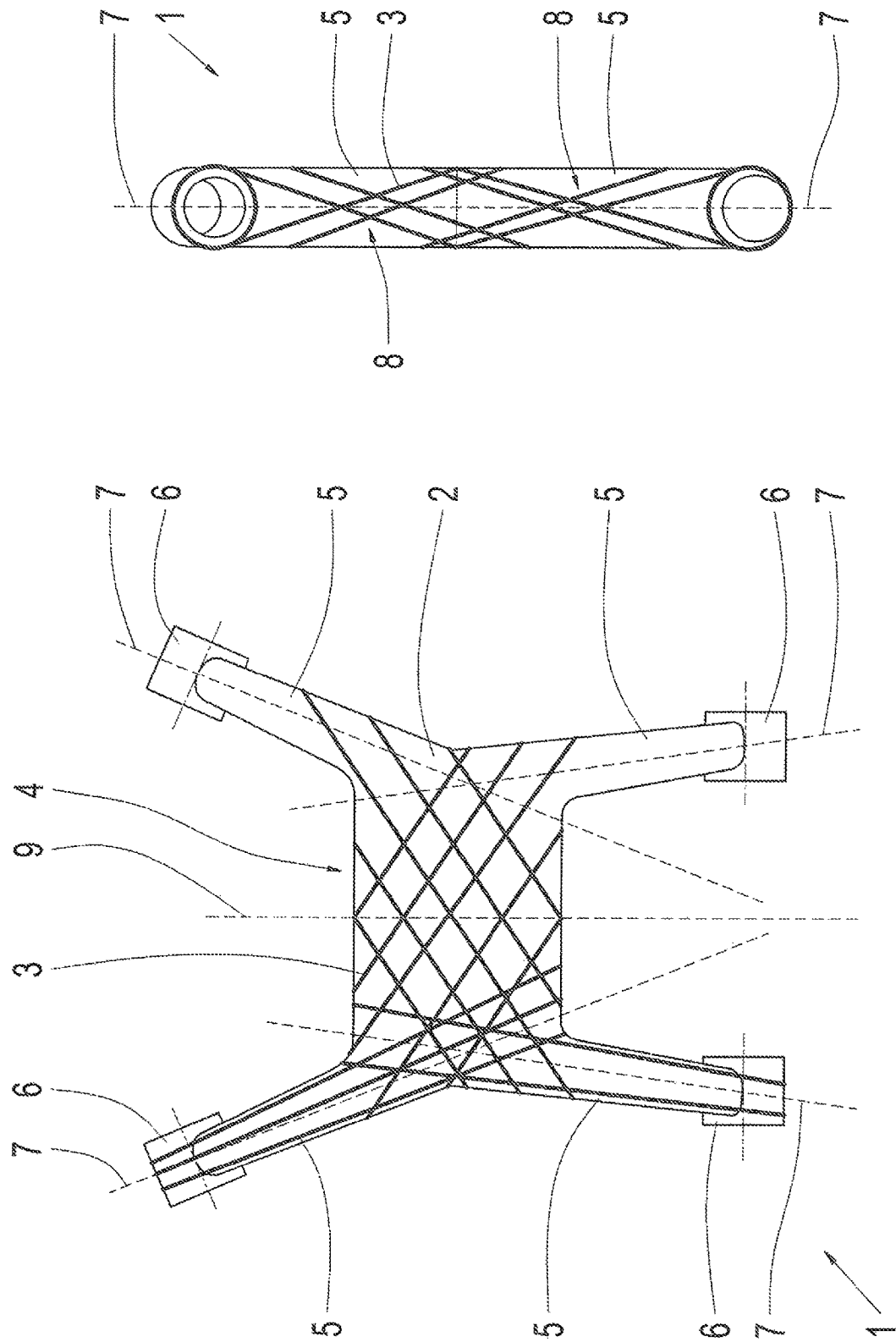
FIG. 1: A schematic view from above, of a four-point link according to the invention.
FIG. 2: A schematic edge view of the four-point link according to the invention shown in FIG. 1, FIG. 3: A schematic view from above, of a core element with four bushings arranged on it, for the four-point link according to the invention shown in FIG. 1, FIG. 4: A schematic side view of the core element shown in FIG. 3, FIG. 5: A schematic sectioned representation of a partially illustrated, different example embodiment of a four-point link according to the invention.

According to FIG. 1 a four-point link 1 according to the invention for a wheel suspension—not shown here—of a vehicle—also not shown here—comprises a core element 2, a thread 3 and four bushings 6. The thread 3 is shown as an example and in a very simplified form. In particular, the thread 3 essentially forms the entire surface of the four-point link 1. The core element 2 consists of a torsional element 4 and four supporting arms 5 integrally connected to the torsional element 4. At each distal end of the respective supporting arm 5 is arranged a corresponding bushing 6 for holding in each case a bearing element—not shown here —, in particular a molecular joint. The four-point link 1 is used, for example, in a semitrailer tractor as a chassis connection and then fulfils the functions of a wishbone link and the stabilizer. Thus, the four-point link 1 is responsible for the transverse guiding and in particular for the longitudinal guiding of the axle. Furthermore, the four-point link 1 also ensures roll stabilization.

In that the core element 2 and the respective bushings 6 are wrapped around by the thread 3, the bushings 6 and the thread 3 are connected to one another at least by friction. The core element 2 is not load-bearing and serves only to determine the shape of the thread 3. The thread 3 consists of a plurality of endless fibers and is pre-impregnated with a resin. In contrast the core element 2 is made from a foam material. Furthermore, each bushing 6 is made from a metallic material. The core element 2, the thread 3 and the bushings 6 are quasi-integral, being intrinsically connected.

In particular, just one thread 3 is wrapped around the core element 2 and the respective bushings 6. On each supporting arm 5 the thread 3 is laid essentially parallel to a respective longitudinal axis 7 of the supporting arm 5 concerned, in order to absorb bending stresses. Moreover, on the torsional element 4 the thread 3 is laid at an angle of around 40° to around 60°, preferably 45° relative to a longitudinal axis 9 of the four-point link 1, in order to absorb shear stresses produced by torsion.

FIG. 2 shows the four-point link 1 of FIG. 1, viewed from an edge. On each end face 8 of the supporting arm 5 concerned, the thread 2 is laid at an angle of around 20° relative to a respective longitudinal axis 7 of the supporting arm 5 concerned, in order to absorb shear stresses produced by a transverse force.

FIG. 3 shows the core element 2 and the bushings 6 attached thereto as in FIG. 1. However, the core element 2 is shown before being wrapped with the thread 3. The core element 2 has a number of cutouts 10, preferably two, to accommodate a plurality of thread turns. The two cutouts 10 locally reduce the thickness of the torsional element 4 and thereby avoid clumping of the material is this area on the outside of the torsional element 4, where there are numerous cross-over points of the thread 3. In addition, on the torsional element 4 there are formed four contact surfaces 13 for supporting the turning points of the thread 3 as necessitated by the load.

FIG. 4 shows the core element 2 of FIG. 3 viewed from the side. FIG. 4 shows in particular the flat structure of the core element 2, which results in a flat structure of the finished four-point link 1. This saves fitting space. Furthermore, it is apparent from FIG. 3 that the respective distal ends of the respective supporting arms 5 are at least in part complementary to the corresponding bushings 6—as shown in FIG. 3.

FIG. 5 shows another example embodiment of the four-point link 1 according to the invention, viewed in cross-section. Specifically, a distal end of one of the supporting arms 5 is shown. One of the four supporting arms 5 is described below, but the description applies just as well to the other three supporting arms 5, which are essentially formed identically. A bushing 6 arranged on the supporting arm 5 is at least partially connected in a form-fitting manner with a load-transfer element 11. In particular the load-transfer element 11 is at least partially of semicircular shape in order to enclose the bushing 6 in part. The load-transfer element 11 is provided essentially in order to transfer compressive forces from the bushing 6 into the thread 3 connected radially thereto. The thread 3 and the load-transfer element 11 are connected with one another by friction. The load-transfer element 11 is made from a sheet-metal element.

FIG. 6 shows a preferred method for producing the four-point link 1 according to the invention. The core element 2 with the four bushings 6 attached thereto is held on a robot arm 12 that can move in three dimensions. In addition the pre-impregnated thread 3 is wound onto a rotatable spindle 14 and is unwound from the spindle 14 through a fixed guiding element 15 and wrapped around the core element 2. During the wrapping of the core element 2 with the thread 3, the core element 2 is guided by the robot arm 12.

FIG. 7 shows another preferred method for producing the four-point link 1 according to the invention. The core element 2 with the four bushings 6 attached on it is held on a preferably rotatable spindle 16. In addition the pre-impregnated thread 3 is also wound onto a rotatable spindle 14 and is unwound from the spindle 14 through a guiding element 15 arranged on the robot arm 12 and then wrapped round the core element 2. Thus, the robot arm 12 guides the thread 3 via the guiding element 15 around the core element 2 in order to wrap the latter with the thread 3. For the wrapping of a torsional element 4 formed on the core element 2 essentially all over its surface, the core element 2 is taken off the spindle 16 and re-attached at least once.

The invention is not limited to the above-described example embodiments. Other further developments emerge in particular from the description.

INDEXES

1 Four-point link
2 Core element
3 Thread

4 Torsional element
5 Supporting arm
6 Bushing
7 Longitudinal axis of a supporting arm
8 End face of a supporting arm
9 Longitudinal axis of the four-point link
10 Cutout
11 Load-application element
12 Robot arm
13 Contact surface
14 Spindle
15 Guiding element
16 Spindle

The invention claimed is:

1. A four-point link for a wheel suspension of a vehicle, the four-point link comprising:
a core element,
a thread or a plurality of parallel threads, and
four bushings,
each thread being immersed in or pre-impregnated with a resin,
the core element defining a longitudinal axis of the four-point link and comprising a torsional element and four supporting arms integrally connected to the torsional element, and
a respective bushing being arranged, on each respective distal end of the supporting arms, for holding a respective bearing element,
the core element and the respective bushings being at least partially wrapped around with the thread, in each case, in order to connect, at least by friction, the bushing to the thread, and
the core element has cutouts that accommodate a plurality of thread cross-over points to maintain a consistent material thickness of the torsional element.

2. The four-point link according to claim 1, wherein the thread or the plurality of parallel threads is wrapped many times around the core element and the respective bushings, the core element has a plurality of contact surfaces for supporting turning points of the thread, and the contact surfaces extend laterally relative to the longitudinal axis of the four-point link.

3. The four-point link according to claim 1, wherein the core element is made from a foam material.

4. The four-point link according to claim 1, wherein the bushings are, in each case, made from either a metallic material or a fiber-reinforced plastic.

5. The four-point link according to claim 1, wherein the thread is laid, on each supporting arm, substantially parallel to a respective longitudinal axis of the supporting arm concerned.

6. The four-point link according to claim 5, wherein the thread is laid, on respective end faces of the supporting arms, within an angular range of 15° to 45° relative to the respective longitudinal axis of the supporting arm concerned.

7. The four-point link according to claim 6, wherein the thread is laid, on the torsional element, within an angular range of 40° to 60° relative to the longitudinal axis of the four-point link.

8. The four-point link according to claim 1, wherein the cutouts that accommodate the plurality of thread cross-over points reduce the material thickness of the torsional element.

9. The four-point link according to claim 1, wherein each of the bushings is at least partially interlocked to a respective load-transfer element, and the load-transfer element is connected, at least by friction, to the thread.

10. A method of producing a four-point link, for a wheel suspension of a vehicle, having a core element, a thread or a plurality of parallel threads and four bushings, each thread being pre-impregnated with a resin, the core element having a torsional element and four supporting arms, and a bushing being arranged, on each respective distal end of the supporting arms, for holding a respective bearing element, the method comprising:
producing the core element such that the four supporting arms are integrally connected to the torsional element,
connecting each respective bushing to a respective distal end of the supporting arm concerned,
at least partially wrapping the core element and the respective bushings with the pre-impregnated thread to form at least a frictional connection between the bushing concerned and the thread,
forming cutouts in the core element that accommodate a plurality of thread cross-over points to maintain a consistent material thickness of the torsional element, and
forming a plurality of contact surfaces on the core element that extend laterally relative to a longitudinal axis of the four-point link and support turning points of the thread.

11. The method according to claim 10, further comprising holding the core element on a robot arm such that during the wrapping with the thread, the core element is guided by the robot arm.

12. The method according to claim 10, further comprising holding the core element on a spindle, and guiding the thread with a robot arm in order to wrap the core element in the thread.

13. A four-point link for a wheel suspension of a vehicle, the four-point link comprising:
a core element having a torsional element and four supporting arms being integrally connected to the torsional element, and each of the four supporting arms extending from the torsional element and having a distal end, and the core element defining a longitudinal axis of the four-point link;
four bushings being coupled to the distal ends of the four supporting arms, respectively, and the four bushings being arranged for respectively supporting bearing elements;
at least one thread being pre-impregnated with a resin, and the at least one thread being wrapped around the torsional element and the four supporting arms of the core element and the four bushings to at least frictionally connect the bushings and the at least one thread;
the core element has two cutouts located on opposite lateral sides of the longitudinal axis of the four-point link, the two cutouts reduce a material thickness of the torsional element and accommodate a plurality of cross-over points of the thread to maintain the material thickness of the torsional element consistent; and
the core element has a plurality of flattened contact surfaces that support turning points of the thread and extend laterally relative to the longitudinal axis of the four-point link.

* * * * *